(12) United States Patent
Weksler et al.

(10) Patent No.: US 9,978,423 B2
(45) Date of Patent: May 22, 2018

(54) MODIFIED PLAYBACK RATE FOR PORTIONS OF VIDEO CONTENT

(71) Applicant: Lenovo (Singapore) Pte. Ltd., Singapore (SG)

(72) Inventors: Arnold S. Weksler, Raleigh, NC (US); Russell Speight VanBlon, Raleigh, NC (US); John Carl Mese, Cary, NC (US); Nathan J. Peterson, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days. days.

(21) Appl. No.: 15/277,752

(22) Filed: Sep. 27, 2016

(65) Prior Publication Data

US 2018/0090170 A1    Mar. 29, 2018

(51) Int. Cl.
| | |
|---|---|
| *H04N 5/93* | (2006.01) |
| *G11B 27/00* | (2006.01) |
| *H04N 5/783* | (2006.01) |
| *G11B 27/034* | (2006.01) |
| *G11B 27/28* | (2006.01) |
| *G06K 9/00* | (2006.01) |

(52) U.S. Cl.
CPC ........ *G11B 27/005* (2013.01); *G06K 9/00765* (2013.01); *G11B 27/034* (2013.01); *G11B 27/28* (2013.01); *H04N 5/783* (2013.01)

(58) Field of Classification Search
CPC .......... H04N 5/783; H04N 5/93; G11B 27/00
USPC ........ 386/343, 351, 353, 278, 280, 282, 285
See application file for complete search history.

(56) References Cited

U.S. PATENT DOCUMENTS

| | | | | |
|---|---|---|---|---|
| 7,557,838 | B2 * | 7/2009 | Ogikubo | G11B 27/032 348/231.3 |
| 7,716,700 | B2 * | 5/2010 | Carlucci | H04N 7/163 715/723 |
| 8,805,172 | B2 * | 8/2014 | Kim | H04N 5/783 386/343 |

* cited by examiner

*Primary Examiner* — Daquan Zhao
(74) *Attorney, Agent, or Firm* — Schwegman Lundberg & Woessner, P.A.

(57) ABSTRACT

A method and system includes obtaining video content at a programmed processor. The programmed processor generates a playback rate for each of multiple portions of the video content based on a predetermined playback rate obtained by the processor for each of the multiple portions. The processor further modifies the multiple portions of the video content for playback, wherein each portion is modified in accordance with the generated playback rate which is variable for each of the portions. The modified multiple portions may be provided to a monitor device for playing the video content via in accordance with the generated playback rate for each portion of the video content.

20 Claims, 3 Drawing Sheets

| | | 210 | 215 | 220 | 225 | 230 | 235 | 240 | 250 |
|---|---|---|---|---|---|---|---|---|---|
| VIDEO 1 | | PORTION 1 | START | END | DIALOG | KEY SCENE | CROWD YES... | | 1X |
| | | PORTION 2 | START | END | PAN-NO DIALOG | NOT KEY | CROWD NO... | | 2X |
| | | . . . | . . . | . . . | . . . | . . . | . . . | | . . . |
| | | PORTION N | START | END | LONG KISS | | | . . . | SKIP |
| VIDEO 2 . . . | | | | | | | | | |

MODIFIED PLAYBACK RATE FOR PORTIONS OF VIDEO CONTENT

BACKGROUND

A quick mode may be used to play video content at greater than intended rate. The intended speed may be identified as a normal rate, or 1×, and some playback mechanisms, like network based video services, include a quick mode that allows playback at up to 2×, or twice a normal viewing rate.

SUMMARY

A method includes obtaining video content at a programmed processor. The programmed processor generates a playback rate for each of multiple portions of the video content based on a predetermined playback rate obtained by the processor for each of the multiple portions, modifies the multiple portions of the video content for playback, wherein each portion is modified in accordance with the generated playback rate which is variable for each of the portions, and provides the modified multiple portions to a monitor device for playing the video content via in accordance with the generated playback rate for each portion of the video content.

A further method includes obtaining video content, determining a first length of time available for playback of the video content, determining a second length of time for playback of the video content at a first rate, wherein the second length of time is longer than the first length of time, generating a playback plan as a function of the first length of time and the second length of time, wherein the playback plan includes different rates of playback for different portions of the video content, and providing the video content for playback in accordance with the playback plan, wherein the playback plan includes different rates of playback for different portions of the video content the playback of the video content to playback within the length of time available.

A system includes a processor and memory device having a program stored thereon for execution by the processor to obtain video content, determine a first length of time available for playback of the video content, determine a second length of time for playback of the video content at a first rate, wherein the second length of time is longer than the first length of time, generate a playback plan as a function of the first length of time and the second length of time, wherein the playback plan includes different rates of playback for different portions of the video content, and provide the video content for playback in accordance with the playback plan, wherein the playback plan includes different rates of playback for different portions of the video content the playback of the video content to playback within the length of time available.

DETAILED DESCRIPTION

Figures 1, 2:
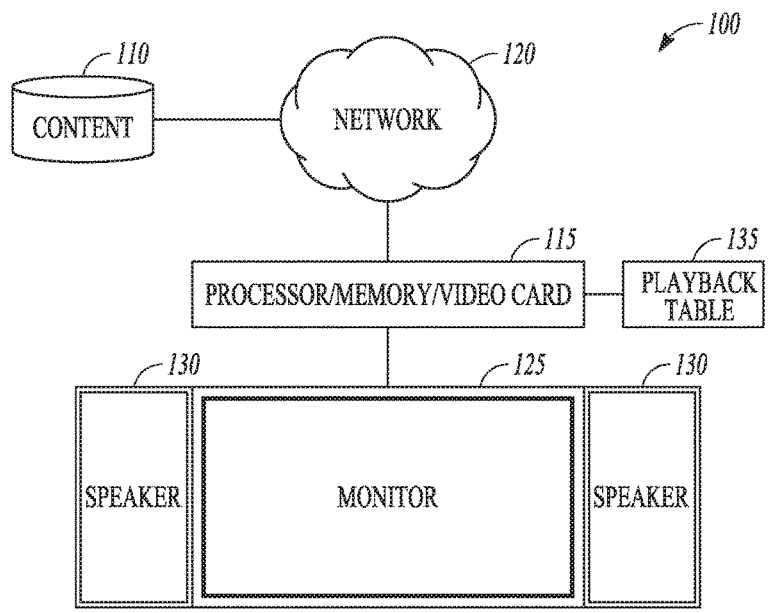
FIG. 1 is a block diagram of a system to provide adaptable video playback according to an example embodiment.
FIG. 2 is an illustration of a portion of an example playback table according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope, of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

While some video playback mechanisms provide a quick mode to play video content at greater than normal rate, they lack the ability to easily control the rate to ensure a viewer experiences important dialog or critical parts or aspects of the video content. The normal or intended rate of playback is usually an accurate temporal representation of action being captured by the video, or animation sequences as designed to be seen. The normal rate may be referred to as a 1× playback speed or rate.

Prior playback mechanisms provide a faster playback rate, such 2×, or twice the normal or intended speed of the video content. The audio at such higher playback rates may be modified to have a same pitch as dialog played at normal rates so that dialog does not experience the so-called chipmunk effect such that the dialog is not played back at a higher pitch than a normal pitch occurring at 1× playback rates.

In various embodiments, a video content playback mechanism provides an ability to watch a video that is modified to play within a length of time that is less than the time it would take to play a video at a normal rate. The playback mechanism may modify the video in several different ways, such as increasing the playback rate of selected portions of the video content, or using one playback rate selected to play the video in a length of time available, or just to reduce the amount of time it takes to play back the video. In further embodiments, portions of the content may be removed to help fit playback within an available time. The removed portions may include commercials, panning without dialog, long kissing scenes, or other types of scenes.

The selection of portions and different rates of playback for various portions may be based on a parsing of the video content done by a third party or content artist or creator in some embodiments and tracked in a table or file with start and end times and description of the type of content for each portion corresponding to the start and end times. In further embodiments, a user's preference for various types of content may be utilized to determine rates of playback for each portion. In still further embodiments the preferences of a number of users may be used to identify the portions and playback rates. Utilizing the preferences of a number of users in this manner may be referred to as crowd sourcing.

In still further embodiments, a user may specify an amount of time available for watching video content. The playback mechanism or other source, such as a networked video server service may select a video that can be compressed or modified for playback within the specified amount of time, or may compress or modify a user selected video to fit within the specified amount of time, either using a single selected playback rate or modifying the playback rate for different portions of the video. The video may be selected from a list of videos based on user preferences that are commonly generated in current video server services. The specified amount of time may also be derived from a user's electronic calendar by determining an amount of time that the user available until a next appointment, and compressing/modifying a video to fit within that time.

FIG. 1 is a block diagram of a system 100 to provide adaptable video playback to a user. In one embodiment, content is stored in a storage device 110, which may be networked storage coupled to a processor 115 via a network 120, or local storage. The storage device 110 may contain one or more videos, referred to as video content. The processor 115 receives the video content, modifies it, and plays it back on a monitor 125 for viewing by a user. The monitor may include speakers 130 and various input devices for further controlling playback functions, such as selecting videos for playback, providing preferences for video playback modification, and providing a time available for watching video content. The processor 115 may include memory and a video driver for providing video to the monitor 125 for playback. The processor may further utilize a playback table 135 that may divide a video into portions such that different playback rates may be applied to different portions depending on user preferences or characterization of the portions by multiple users in a crowd sourced manner or even by a distributor or creator of the video content.

In some embodiments, a networked video server may stream the modified video to a user for playback via monitor 125. Content block 110 is also representative of such a video server, and may obtain playback rates and video modification indications from the playback table 135.

FIG. 2 is a table 200 showing a portion of an example playback table 135. A first video 210 is divided into N portions 215 having start 220 and stop 225 times. N may vary from video to video depending on the content of the video. If a video has a lot of short scenes, N may be fairly large, such as 100 or more. If a video has longer scenes, N may be smaller. N may also be dependent on the length of the video. The portions may be identified by a creator of the video in some embodiments and may correspond well with scenes in the video, or may even be arbitrary, or may be crowd sourced in still further embodiments by averaging timing of portions that have been identified by multiple users to generate start and stop times for a crowd sourced portion. The users may indicate a relative importance of each portion, which may also be averaged and correlated to a playback rate. The portions may also simply correspond to portions of the video that contain dialog or do not contain dialog.

Each portion may have an indication of dialog or no dialog as indicated at 230. Note that in further embodiments, software, such as speech recognition software, may be used to determine whether or not there is dialog in any portion or scene during playback, and the table may be bypassed. If no words are recognized during a portion, that portion may be identified as having no dialog. Column 230 may also contain scene type descriptions, such as long kiss, car chase, fight scene, scenery pan, etc.

At 235, an indication of whether a scene is a key scene, such as a scene with subtle elements that might not be well perceived at a rate of play greater than 1×, may be included. Spoiler alert: Such a key scene indication may apply to scene where a superhero is buried and the sand above the grave rises in an innocuous manner that would not be readily perceivable if played at a higher speed or rate. A key scene indication may also be used for scenes that a creator of the video content deems to be very important to understanding and fully enjoying the video.

In still further embodiments, a crowd sourced indicator 240 may be used to determine which portions may be played at faster rates without interfering with enjoyment of the video. The crowd sourced indicator may include a speed at which the video may be played, such as 1×, 1.5×, 2×, or higher. In some instances, users may indicate the portion or scene should be played slower than 1×.

Table 200 may include more indicators for different types of scenes, such as fights, car chases, panning of scenery, kissing scenes, and other common types of scenes as indicated at 230. In one embodiment, a final rate column 250 is used to identify the rate of playback for each portion that has been selected. Rates shown for example include 1× for portion 1, 2× for portion 2, and a modification indication of skip for portion N, which may correspond to credits. Skip may be thought of as a playback rate of very fast.

Figures 3, 4:
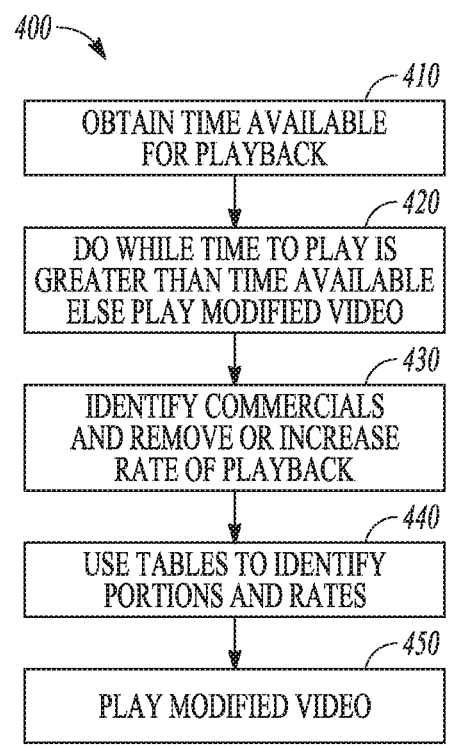
FIG. 3 is an illustration of a table of user playback preferences according to an example embodiment.
FIG. 4 is a flowchart of a method of playing back video in modified form according to an example embodiment.

A table 300 shown in FIG. 3 may be used to indicate a user's preferences for playback of each type of scene or portion. Then the type of scene in a portion is identified from table 200, table 300 may indicate a rate at which that type of scene may be played. For example, in table 300, the user has indicated that pan scenes may be played at 2×, dialog at 1.5×, key scenes at 1×, other types of scenes at whatever the crowd has indicated, and commercials may be played at 3×, or skipped completely if permitted by the content provider. Processor 100, executing code, may use these preferences to fit a video within a specified amount or time, or simply compress the video to play in less time than normal speed.

FIG. 4 is a flowchart illustrating one example method 400 of playing back a video in modified form. At 410, a time available for playback is obtained. The time available may be received from a user or even derived from a user's electronic calendar by determining how much time there is between the current time and a time of the start of a next event on the calendar. In some cases, there may be no time specified or the length of time available may be greater than the length of a video that is being considered for watching by the user. In that case, the remaining elements of method 400 may be performed to simply reduce the amount of time it takes to play back the video without significantly decreasing the potential enjoyment of the playback by the user.

At 420, where the playback time at normal speed is greater than a time available, the elements following 420 may be performed at least until an amount of time to play a modified video is identified such that playback fits within the available time. The order of such elements following element 420 may be varied in further embodiments. However, in the example shown, at 430, commercials are first identified and modified. The identification of commercials may be performed in many different ways. Usually, the content has metadata that signifies wherein commercials may be inserted at logical break points in the video content. Local broadcast stations typically use the information in the metadata that identifies a length of time for insertion of a local commercial. Such metadata may be easily identified and used to determine what part of the video comprises commercials as well as a length of time of the commercials. The commercials may then be skipped, if permitted, or perhaps played at a higher rate, such as 2× or 3× in various embodiments. The time savings may be easily calculated by simply dividing the time of the commercial by the rate of playback, and using the result as the time taken by the commercial. In further embodiments, commercials may be identified by observing segue effects, such as fading, or even observing the full spectrum utilization of audio that many commercials employ.

At 440, the tables 200 and 300 may be used to identify different types of scenes represented in portions of the video content and apply the rates specified by user preferences. The modified video is indicated as being played at 450. The modified video may be modified via changing playback speeds for different portions, removing commercials or playing them at a higher rate, or a combination of both to either reduce the time it takes to play the video or to meet a time available. If meeting a time available, the modifications of the video may be prioritized such that for example, commercials are removed first. If after removing the commercials or assigning a faster rate of playback for them, more time needs to be recovered, other portions may be identified for faster playback until the time available is met. In some embodiments, table 2 may be modified to include a final rate of play in column 250 assigned to each portion, and may be used by processor 115, or a content server via a network to provide the video to the monitor 125 at the rates assigned. Note that method 400 may be performed for an entire video prior to beginning playback, or may be applied to each portion during playback. When performed during playback, aspects of method 400 related to fitting a video playback within an identified available time may be bypassed, resulting in a variable overall time for playback depending on rates, including modifications applied in real time as the video is played back.

Various examples of playback of a 60 minute video are now provided. In a first example, a user may have 60 minutes, and the video may be played back at normal speed.

In a second example, the video may be played back with the commercials removed or played back at a higher rate. 14-18 minutes in one example may be saved by modifying the video with respect to commercials, resulting in a playback time for the video of 42 to 46 minutes.

In a third example, the entire video may be played faster than 1× with commercials removed. When played at 2×, the playback time may be approximately 21-23 minutes.

In a fourth example, additional portions maybe skipped or played faster.

In a fifth example, an average rate may be calculated to play back the video within an available time, skipping commercials, but preserving as much content as possible.

In a sixth example, the playback rate may be fluctuated during selected portions of the video content. Portions with dialog may be played back a slightly higher than normal rate, such as 1.2× to 1.5× to preserve the ability to understand the dialog, while portions identified as less interesting, such as characters gazing into each other's eyes, or skyline panning, may be played at a higher rate.

In a seventh example, crowd sourced recommendations for portions of the video content may be used to determine a rate of play for such portions. Various users, or even producers of the video content may provide recommended rates for portions of content that may identify key dramatic moments, important dialogue, or critical points to be appreciated by slowing down a higher than normal rate of play during such portions. Similarly, less important portions may be played at a higher rate. The sourcing of such rates may be performed by people familiar with the content, which saves an average user from having to guess at playback rates, or simply go with their own usual preferences for different types of scenes.

In an eighth specific example, some users may desired to keep commercials and plays in special football games, while playing other scenes significantly faster, such as reviewed calls. The portions of table 200 may be selected to correspond to the different types of scenes according to the type of content. In other words, a football game may have each play correspond to a portion, with time between plays corresponding to other portions, and commercials corresponding to still other portions. For normal football games, the commercials may be skipped or played faster.

Figure 5:
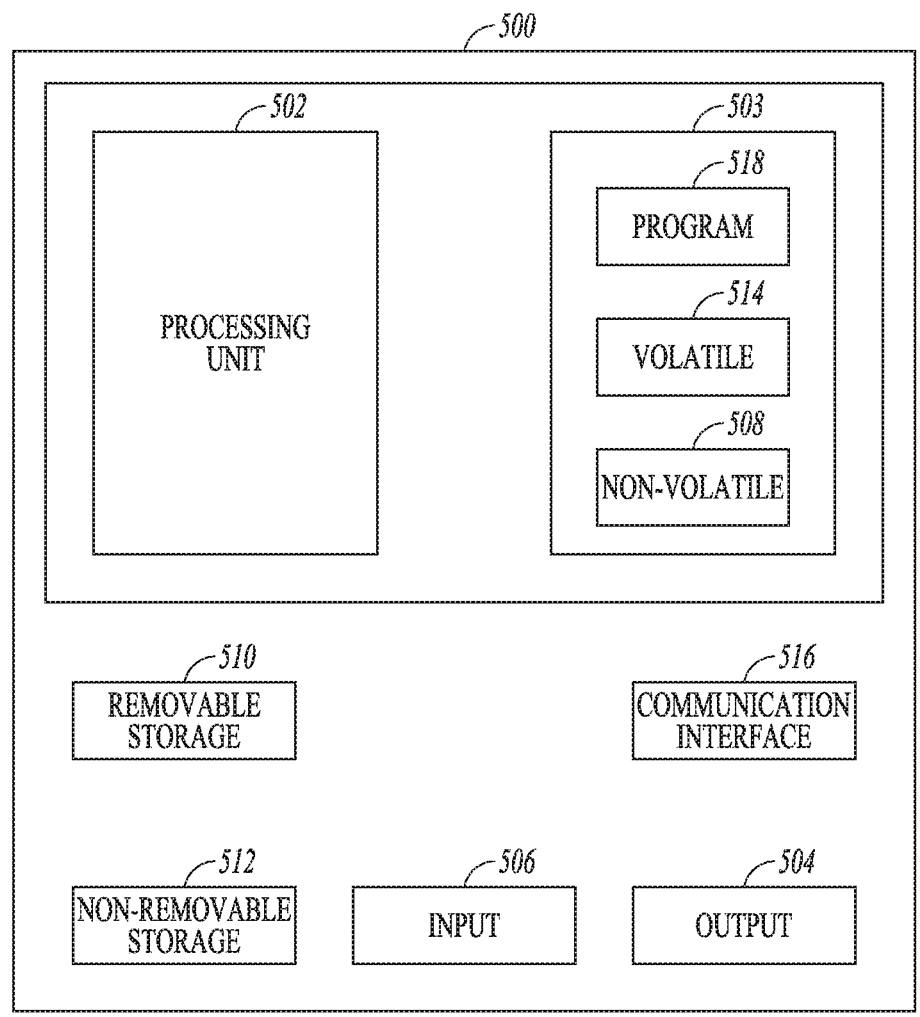
FIG. 5 is a block diagram of computer system used to implement methods according to an example embodiment.

FIG. 5 is a block schematic diagram of a computer system 500 to implement device 100 and other computing resources according to example embodiments. All components need not be used in various embodiments. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication interface 516. Output 504 may include a display device, such as a touchscreen, that also may serve as an input device. The computer may operate in a networked environment using the communication interface 516 to connect to one or more remote computers, such as database servers. The remote computer may include a personal computer (PC), server, router, network PC, a peer device or other common network node, or the like. The communication interface 516 may include a Local Area Network (LAN), a Wide Area Network (WAN) or other networks.

Computer-readable instructions stored on a computer-readable medium are executable by the processing unit 502 of the computer 500. A hard drive, CD-ROM, and RAM are some examples of articles including a non-transitory computer-readable medium. For example, a computer program 518 may be used to cause processing unit 502 to perform one or more methods or algorithms described herein.

EXAMPLES

1. In example 1, a method includes obtaining video content at a programmed processor, the programmed processor generating a playback rate for each of multiple portions of the video content based on a predetermined playback rate obtained by the processor for each of the multiple portions, modifying the multiple portions of the video content via the programmed processor for playback, wherein each portion is modified in accordance with the generated playback rate which is variable for each of the portions, and providing the modified multiple portions to a monitor device for playing the video content via in accordance with the generated playback rate for each portion of the video content.

2. The method of example 1 wherein generating a playback rate for each of multiple portions of the video content comprises accessing a table that includes identifications of portions of the video content and an associated playback rate.

3. The method of example 2 wherein the associated playback rate for each portion is determined according to user preferences for a type of scene in each portion.

4. The method of example 2 wherein the associated playback rate for each portion is determined according to crowd sourced preference for a type of scene in each portion.

5. The method of example 2 wherein the associated playback rate for a portion is determined by a producer of the portion.

6. The method of example 1 wherein generating a playback rate for each of multiple portions comprises detecting dialog in the portion and setting a playback rate as a function of detected dialog in the portion.

7. The method of example 1 wherein the generated playback rate is selected from skipping the portion, and varying between 1× and 2×.

8. The method of example 1 wherein the generated playback rate includes skipping a portion, wherein skipped portions comprise commercials.

9. The method of example 8 wherein commercials are identified as a function of video content metadata identifying the commercials.

10. In example 10, a method includes obtaining video content, determining a first length of time available for playback of the video content, determining a second length of time for playback of the video content at a first rate, wherein the second length of time is longer than the first length of time, generating a playback plan as a function of the first length of time and the second length of time, wherein the playback plan includes different rates of playback for different portions of the video content, and providing the video content for playback in accordance with the playback plan, wherein the playback plan includes different rates of playback for different portions of the video content the playback of the video content to playback within the length of time available.

11. The method of example 10 wherein generating a playback plan having different rates of playback for different portions of the video content comprises accessing a table that includes identifications of portions of the video content and an associated playback rate.

12. The method of example 11 wherein the associated playback rate for each portion is determined according to user preferences for a type of scene in each portion.

13. The method of example 10 wherein generating a playback plan including different rates for different portions comprises detecting dialog in the portion and setting a playback rate as a function of detected dialog in the portion.

14. The method of example 10 wherein the different rates are selected from skipping the portion, and varying between 1× and 2×.

15. The method of example 10 wherein the playback rate includes skipping a portion, wherein skipped portions comprise commercials.

16. The method of example 15 wherein commercials are identified as a function of video content metadata identifying the commercials.

17. In example 17, a system includes a processor and a memory device having a program stored thereon for execution by the processor to obtain video content, determine a first length of time available for playback of the video content, determine a second length of time for playback of the video content at a first rate, wherein the second length of time is longer than the first length of time, generate a playback plan as a function of the first length of time and the second length of time, wherein the playback plan includes different rates of playback for different portions of the video content, and provide the video content for playback in accordance with the playback plan, wherein the playback plan includes different rates of playback for different portions of the video content the playback of the video content to playback within the length of time available.

18. The system of example 17 wherein the playback plan having different rates of playback for different portions of the video content is generated by accessing a table that includes identifications of portions of the video content and an associated playback rate.

19. The system of example 18 wherein the associated playback rate for each portion is determined according to user preferences for a type of scene in each portion, and wherein the different rates are selected from skipping the portion, and varying between 1× and 2×.

20. The system of example 10 wherein the playback plan including different rates for different portions is generated by detecting dialog in the portion and setting a playback rate as a function of detected dialog in the portion.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method comprising:
 obtaining video content at a programmed processor;
 the programmed processor generating a playback rate for each of multiple portions of the video content based on a predetermined playback rate obtained by the processor for each of the multiple portions, wherein generating the playback rate includes detecting whether dialog is present in one or more of the portions, and setting a playback rate for the one or more portions responsive to detection whether dialog is present in the one or more portions;
 modifying the multiple portions of the video content via the programmed processor for playback, wherein each portion is modified in accordance with the generated playback rate which is variable for each of the portions; and
 providing the modified multiple portions to a monitor device for playing the video content in accordance with the generated playback rate for each portion of the video content.

2. The method of claim 1 wherein generating a playback rate for each of multiple portions of the video content comprises accessing a table that includes identifications of portions of the video content and an associated playback rate.

3. The method of claim 2 wherein the associated playback rate for each portion is determined according to user preferences for a type of scene in each portion.

4. The method of claim 2 wherein the associated playback rate for each portion is determined according to crowd sourced preference for a type of scene in each portion.

5. The method of claim 2 wherein the associated playback rate for a portion is determined by a producer of the portion.

6. The method of claim 1 wherein detecting whether dialog is present in one or more of the portions includes using speech recognition software to determine whether or not there is dialog in the one or more portions.

7. The method of claim 1 wherein the generated playback rate is selected from skipping the portion, and varying between 1× and 2×.

8. The method of claim 1 wherein the generated playback rate includes skipping a portion, wherein skipped portions comprise commercials.

9. The method of claim 8 wherein commercials are identified as a function of video content metadata identifying the commercials.

10. A method comprising:
obtaining video content;
determining a first length of time available for playback of the video content;
determining a second length of time for playback of the video content at a first rate, wherein the second length of time is longer than the first length of time;
generating a playback plan as a function of the first length of time and the second length of time, wherein the playback plan includes different rates of playback for different portions of the video content; and
providing the video content for playback in accordance with the playback plan, wherein the playback plan includes different rates of playback for different portions of the video content the playback of the video content to playback within the length of time available.

11. The method of claim 10 wherein generating a playback plan having different rates of playback for different portions of the video content comprises accessing a table that includes identifications of portions of the video content and an associated playback rate.

12. The method of claim 11 wherein the associated playback rate for each portion is determined according to user preferences for a type of scene in each portion.

13. The method of claim 10 wherein generating a playback plan including different rates for different portions comprises:
detecting dialog in the portion; and
setting a playback rate responsive to detection of dialog in the portion.

14. The method of claim 10 wherein the different rates are selected from skipping the portion, and varying between 1× and 2×.

15. The method of claim 10 wherein the playback plan includes skipping a portion, wherein skipped portions comprise commercials.

16. The method of claim 15 wherein commercials are identified as a function of video content metadata identifying the commercials.

17. A system comprising:
a processor; and
a memory device having a program stored thereon for execution by the processor to:
obtain video content;
determine a first length of time available for playback of the video content;
determine a second length of time for playback of the video content at a first rate, wherein the second length of time is longer than the first length of time;
generate a playback plan as a function of the first length of time and the second length of time, wherein the playback plan includes different rates of playback for different portions of the video content; and
provide the video content for playback in accordance with the playback plan, wherein the playback plan includes different rates of playback for different portions of the video content the playback of the video content to playback within the length of time available.

18. The system of claim 17 wherein the playback plan having different rates of playback for different portions of the video content is generated by accessing a table that includes identifications of portions of the video content and an associated playback rate.

19. The system of claim 18 wherein the associated playback rate for each portion is determined according to user preferences for a type of scene in each portion, and wherein the different rates are selected from skipping the portion, and varying between 1× and 2×.

20. The system of claim 17 wherein the playback plan including different rates for different portions is generated by:
detecting dialog in the portion; and
setting a playback rate responsive to detection of dialog in the portion.

* * * * *